No. 786,143. PATENTED MAR. 28, 1905.
J. R. NORTON.
DOUBLE ROTARY FORCE PUMP.
APPLICATION FILED AUG. 5, 1904.
3 SHEETS—SHEET 1.
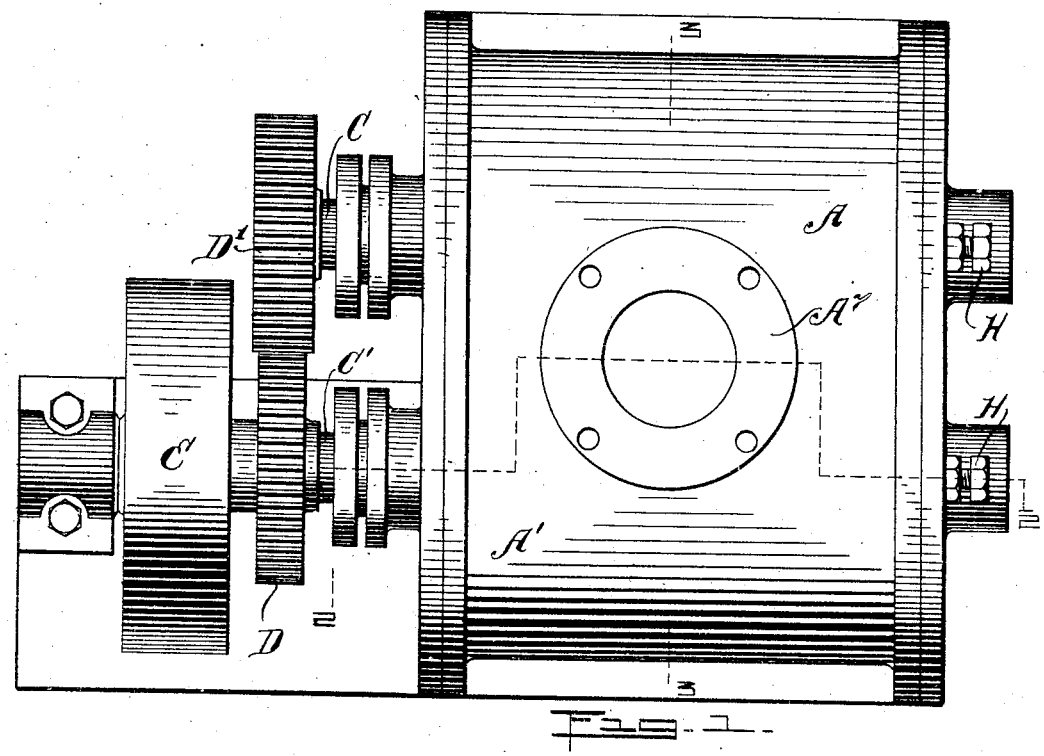
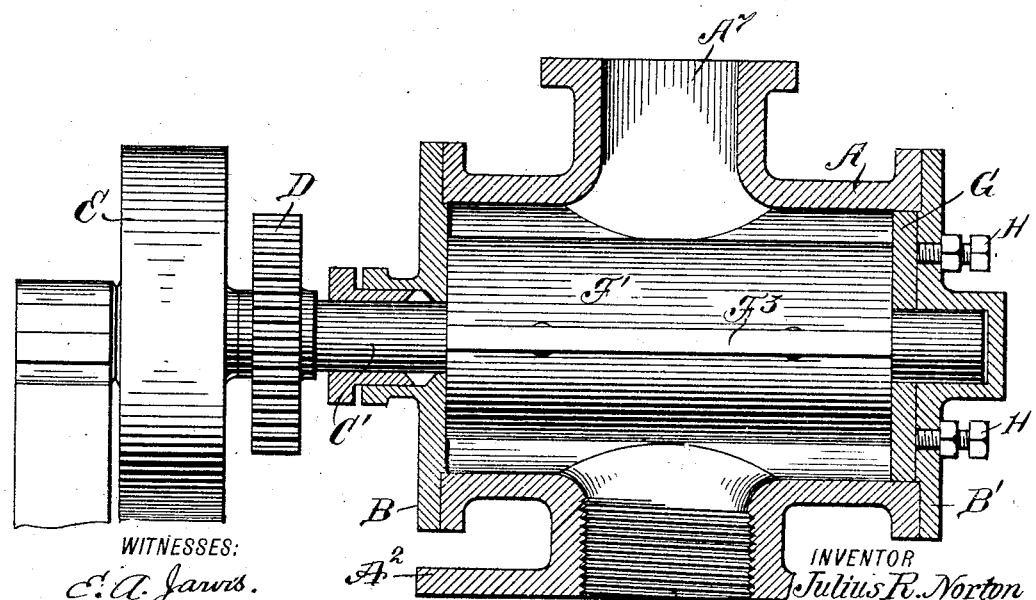
WITNESSES:
INVENTOR
Julius R. Norton
BY
ATTORNEYS

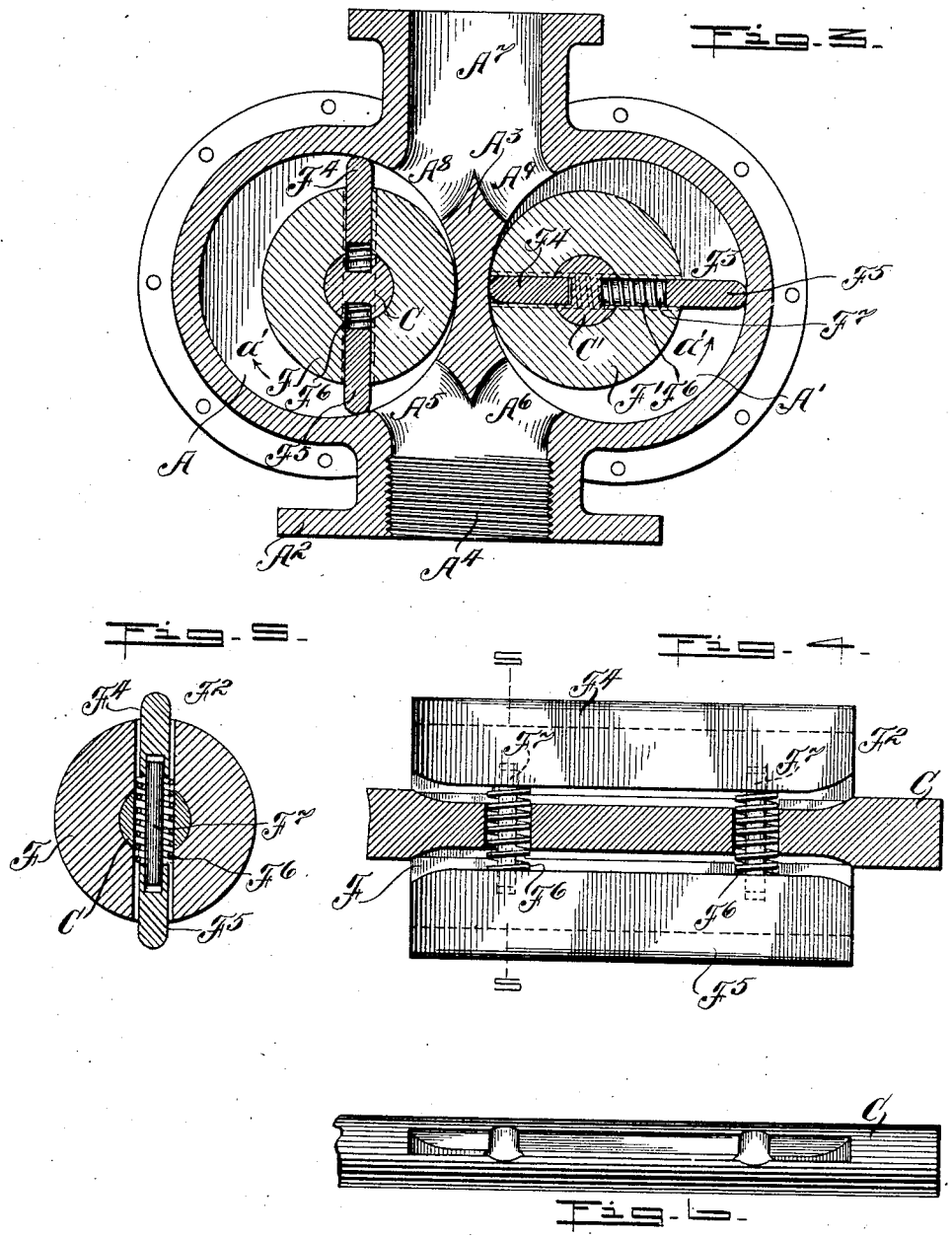

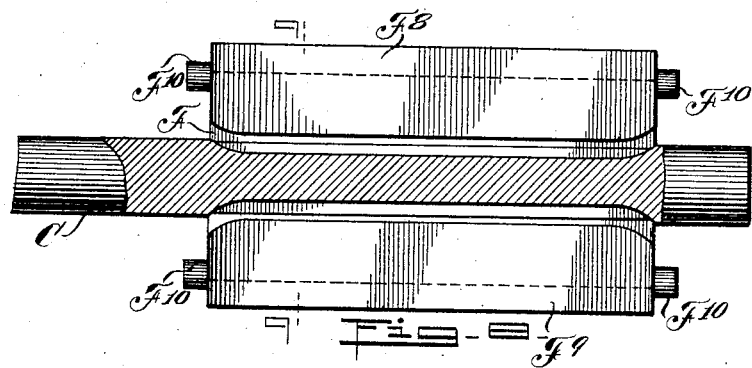
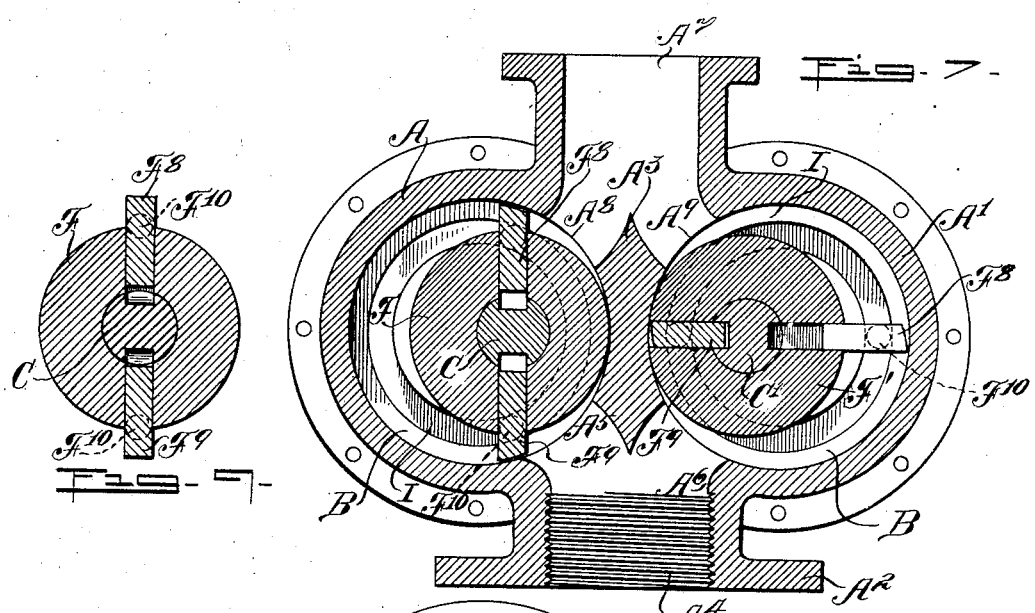
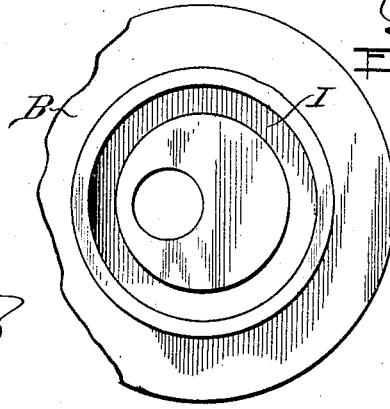

No. 786,143.                                        Patented March 28, 1905.

UNITED STATES PATENT OFFICE.

JULIUS R. NORTON, OF SAN ANTONIO, TEXAS.

DOUBLE ROTARY FORCE-PUMP.

SPECIFICATION forming part of Letters Patent No. 786,143, dated March 28, 1905.

Application filed August 5, 1904. Serial No. 219,626.

*To all whom it may concern:*

Be it known that I, JULIUS R. NORTON, a citizen of the United States, and a resident of San Antonio, in the county of Bexar and State of Texas, have invented a new and Improved Double Rotary Force-Pump, of which the following is a full, clear, and exact description.

The object of the invention is to provide a new and improved double rotary force-pump which is simple and durable in construction, not liable to easily get out of order, very effective in operation, and arranged to render the pump positive in its action and to prevent any loss of power.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the figures.

Figure 1 is a plan view of the improvement. Fig. 2 is a side elevation of the same, one of the cylinders being shown in section on the line 2 2 of Fig. 1. Fig. 3 is a cross-section of the improvement on the line 3 3 of Fig. 1. Fig. 4 is a side elevation of one of the pistons and its piston-heads, the shaft of the piston being shown in section. Fig. 5 is a cross-section of the same on the line 5 5 of Fig. 4. Fig. 6 is a plan view of the same. Fig. 7 is a cross-section of a modified form of the improvement. Fig. 8 is a side elevation of one of the pistons, the shaft of the piston being shown in section. Fig. 9 is a cross-section of one of the pistons, and Fig. 10 is an inner face view of one of the cylinder-heads.

The cylinders A and A' of the force-pump are preferably formed in a single casting having a base $A^2$ for fastening the pump to a suitable foundation, and the said cylinders are arranged parallel and spaced apart by an integral partition $A^3$. The base $A^2$ is made hollow to form an inlet $A^4$, connected by a pipe or other means with the liquid to be pumped, and the said inlet $A^4$ has two branches $A^5$ $A^6$ opening into the cylinders A and A' at the lower end of the partition $A^3$. On the top of the cylinders A and A' is formed an integral outlet $A^7$, having branches $A^8$ and $A^9$ opening into the cylinders A and A' at the upper end of the partition $A^3$, as plainly shown in Fig. 3. In the cylinder-heads B B' for the cylinders are journaled the shafts C C', arranged eccentrically in the cylinders A and A' and connected with each other at their outer ends by gear-wheels D and D', so that the shafts C and C' rotate in unison. One of the shafts (as shown the shaft C) is provided with a pulley E, connected by a belt with other machinery for imparting a rotary motion to the said shaft C, which by the gear-wheels D and D' rotates the other shaft, C', in unison with the shaft C.

On the shafts C and C' within the cylinders A and A' are secured the cylindrical bodies F and F' of pistons having heads $F^2$ $F^3$, diametrically slidable in the said piston-bodies F and F', the piston-head $F^2$ being set in quarter position relative to the piston-head $F^3$, as plainly indicated in Fig. 3. Each of the piston-heads $F^2$ or $F^3$ is made in sections $F^4$ and $F^5$, pressed apart by springs $F^6$, held on guide-pins $F^7$, on which the sections $F^4$ and $F^5$ are slidably mounted, the said guide-pins and their springs extending through suitable openings in the shaft C or C'.

By the arrangement described the outer ends of the sections $F^4$ and $F^5$ of the piston-heads $F^2$ and $F^3$ are always held in firm contact with the inner peripheral face of the corresponding cylinder A or A', so that leakage of liquid from one side of the piston-head section to the other is prevented. The cylindrical piston-bodies F and F' are in peripheral or rolling contact with the partition $A^3$ on opposite sides thereof, as plainly indicated in Fig. 3, and hence when the pistons are rotated in the cylinders A and A' and in the directions of the arrows $a'$ then the liquid is drawn in through the inlet $A^4$ and by the branches $A^5$ $A^6$ into the cylinders A A', in which the piston-heads $F^2$ $F^3$ carry the liquid around and force the same out through the branches $A^8$ $A^9$ into the outlet $A^7$, connected by a pipe or other means with a suitable place of discharge.

By setting the piston-heads of the two pistons in quarter position relatively one to the other it is evident that a continuous pumping of water takes place, and at the same time the pistons counterbalance each other to insure a uniform running of the pump.

In order to prevent priming, a false head G is arranged in one end of each cylinder A and A' to abut against one end of the corresponding piston, and this false head G can be readily adjusted by suitable screws H, as plainly indicated in Fig. 2.

In the modified form illustrated in Figs. 7, 8, 9, and 10 the springs for the piston-heads are dispensed with, and in this case the sections $F^8$ and $F^9$ of the piston-head are wholly independent one of the other, but slidable radially in the piston-bodies F and F'. The ends of the sections $F^8$ and $F^9$ are provided with trunnions $F^{10}$, fitting grooves I, formed in the adjacent cylinder-heads, so that when the pistons are rotated, as previously explained, then the trunnions $F^{10}$ in following the grooves I cause the piston-heads to slide radially in their bearings in the piston-bodies F and F'. Otherwise the construction of the pump is the same as above described relatively to Figs. 1 to 6, and hence further detail description of the pump shown in Fig. 7 is not deemed necessary.

From the foregoing it will be seen that the pump is very simple and durable in construction, is composed of comparatively few parts, not liable to easily get out of order, and by the arrangement set forth a continuous stream is sucked up and forced out by the action of the pump.

I do not limit myself to the detail construction shown, as the same may be varied without deviation from the spirit of my invention.

Having thus described my invention, I claim as new and desire to secure by Letters Patent—

1. A double rotary force-pump, comprising spaced cylinders having an inlet and an outlet common to both cylinders, a partition separating the cylinders and extending into the inlet and outlet and dividing the same into branches opening into the cylinders, the said partition forming part of the cylinders, and pistons mounted to turn eccentrically in the said cylinders, each piston having a cylindrical body in peripheral contact with the partition at a point between the inlet and outlet, and each piston having a piston-head diametrically slidable in the said piston-body, the ends of the piston-head being in engagement with the inner surface of the cylinder.

2. A double rotary force-pump, comprising parallel cylinders spaced and separated by a partition, an inlet having branches opening into the cylinders at each side of the lower part of the partition separating the cylinders, an outlet having branches opening into the cylinders at each side of the upper part of the partition, and pistons mounted to turn eccentrically in the said cylinders, each piston having a cylindrical body in rolling contact with the said partition, and each piston having a piston-head slidable diametrically in the piston-body.

3. A double rotary force-pump, comprising parallel cylinders spaced and separated by a partition, an inlet having branches opening into the cylinders at opposite sides of the lower part of the partition separating the cylinders, an outlet having branches opening into the cylinders at opposite sides of the upper part of the partition, and pistons mounted to turn eccentrically in the said cylinders, each piston having a cylindrical body in rolling contact with the said partition, and each piston having a piston-head slidable diametrically in the piston-body, the piston-head being made in sections pressed apart by interposed springs.

4. A double rotary force-pump, comprising parallel cylinders spaced and separated by an integral partition, an inlet having branches opening into the cylinders at each side of the bottom of the partition separating the cylinders, an outlet having branches opening into the cylinders at each side of the top of the partition, pistons mounted to turn eccentrically in the said cylinders, each piston having a cylindrical body in rolling contact with the said partition, and each piston having a piston-head slidable diametrically in the piston-body, the piston-head being made in sections pressed apart by interposed springs, shafts for the said pistons, and a gearing connecting the shafts with each other to rotate the pistons in unison.

5. A double rotary force-pump, comprising parallel cylinders spaced and separated by a partition and having an inlet and an outlet common to both cylinders, the said partition extending into the inlet and outlet and dividing the same into branches opening into the cylinders, pistons mounted to turn eccentrically in the said cylinders, each piston having a cylindrical body in rolling contact with the said partition, and each piston having a piston-head slidable diametrically in the piston-body, the piston-head being made in sections pressed apart by interposed springs, shafts for the said pistons, and a gearing connecting the shafts with each other to rotate the pistons in unison, the piston-heads of the piston being set in quarter position one relatively to the other.

6. A double rotary force-pump, comprising cylinders having an inlet and outlet common to both cylinders, a partition separating the cylinders, the lower and upper ends of the partition dividing the inlet and outlet into branches opening into the cylinders, and pistons mounted to turn eccentrically in the said cylinders, each piston having a cylindrical body in peripheral contact with the partition at a point between the inlet and outlet, and each piston having a piston-head diametrically slidable in the said piston-body, the ends of the piston-head being in engagement with the inner surface of the cylinder, a false head in one end of each cylinder, and means for adjusting the false head.

In testimony whereof I have signed my name to this specification in the presence of two subscribing witnesses.

JULIUS R. NORTON.

Witnesses:
S. A. PEACOCK,
C. L. McGILL.